United States Patent [19]

Oketani et al.

[11] Patent Number: 5,155,473
[45] Date of Patent: Oct. 13, 1992

[54] TORQUE AND THRUST OVERLOAD DETECTION SYSTEM FOR A MACHINE TOOL

[75] Inventors: Tetsuya Oketani, Gifu; Hirotaka Nishikawa, Ichinomiya; Yoshiaki Mase, Gifu, all of Japan

[73] Assignee: Howa Machinery Ltd., Nagoya, Japan

[21] Appl. No.: 657,164

[22] Filed: Feb. 15, 1991

[30] Foreign Application Priority Data

Feb. 20, 1990 [JP] Japan .................................. 2-39274

[51] Int. Cl.⁵ ............................................ G08B 21/00
[52] U.S. Cl. ................................... 340/680; 408/6
[58] Field of Search .................. 340/680; 408/6, 11, 408/16; 73/862.34

[56] References Cited

U.S. PATENT DOCUMENTS

| | | | |
|---|---|---|---|
| 4,208,904 | 6/1980 | Schindler | 73/862.34 |
| 4,304,511 | 12/1981 | Machida | 408/6 |
| 4,488,443 | 12/1984 | Parkinson | 73/862.33 |
| 4,829,834 | 5/1989 | Masom | 73/862.34 |

FOREIGN PATENT DOCUMENTS 54-10060 5/1979 Japan .
59-142049 8/1984 Japan .
63-28742 6/1988 Japan .

Primary Examiner—Jin F. Ng
Assistant Examiner—Christine K. Oda
Attorney, Agent, or Firm—Ladas & Parry

[57] ABSTRACT

A toolholder assembly is divided into a drive toolholder coupled to the drive spindle of a machine tool, and a driven toolholder carrying a cutting tool such as a drill. The driven toolholder is coupled end to end to a drive toolholder so as to be rotatable relative to the same through a preassigned angle about the toolholder axis. A coiled torsion spring acts between the drive and the driven toolholders for torque transmission from the former to the latter. The drive and the driven toolholders have interdigitating teeth with clearances therebetween. A phase detector such as a proximity switch detects a relative phase displacement that will occur between the interdigitating teeth against the force of the torsion spring upon development of abnormal torque load on the cutting tool. Preferably, the interdigitating teeth have bevels in sliding engagement with each other for causing a relative phase displacement between the teeth upon axial displacement of the driven toolholder toward the drive toolholder, so that not only abnormal torque load but also abnormal thrust load on the cutting tool is detectable by the phase detector.

16 Claims, 7 Drawing Sheets

TORQUE AND THRUST OVERLOAD DETECTION SYSTEM FOR A MACHINE TOOL

BACKGROUND OF THE INVENTION

The present invention relates generally to machine tools, and particularly to a system to be incorporated with a machine tool for detecting excessive torque load, or both torque load and thrust load, to which the cutting tool may be subjected during the operation of the machine tool, in order to protect the cutting tool from destruction due to such overload.

A variety of overload detection systems have been suggested and used with machine tools. Among such known systems is the one described and claimed in Japanese Unexamined Patent Publication No. 59-142049. This prior art device teaches the use of two gears for detecting abnormal torque load on the cutting tool. The first of the two gears is mounted fast on the toolholder for joint rotation therewith. The second gear is coupled to the first gear via elastic means that is subject to torsional deformation in proportion with the cutting torque. The phases of the two gears are detected by respective phase detectors such as proximity switches. The cutting torque is computed electronically on the basis of the phase difference between the gears for comparison with a normal range of torque values.

An objection to this prior art device is that it needs two phase detectors, one for each gear. The device would become far simpler and less expensive in construction if it could do with a single phase detector. Moreover, as used in the prior art device, the two phase detectors have proved to be very easy to give rise to errors in the computation of the cutting torque, as the cuttings produced during machine tool operation unavoidably attach to and accumulate on them.

Japanese Utility Model Publication No. 54-10060 proposes another cutting torque detection system. This second known system comprises a rotary member mounted fast on the spindle, a screw stud on a chuck support, and a torsion spring between the rotary member and the chuck support. The screw stud is rotatably engaged with the rotary member. The torsion spring yields when the cutting torque exceeds a predetermined limit, resulting in a relative phase displacement between rotary member and chuck support and, consequently, in the axial displacement of the screw stud. This axial displacement of the screw stud indicates the excessive torque on the cutting tool.

This second conventional system is also objectionable for the following reasons. The rotary member and the chuck support must be capable of relative phase displacement through a considerably great angle in order to cause axial displacement of the screw stud upon development of excessive cutting torque. Such excessive cutting torque must therefore by very high in comparison with the yielding point of the torsion spring. An additional inconvenience is that it takes an inconveniently prolonged time for the rotary member and the chuck support to undergo relative phase displacement through the required great angle. Consequently, this prior art system fails to set the drive spindle out of rotation instantly upon development of any excessive torque.

Japanese Patent Publication No. 63-28742 teaches how to detect excessive thrust load on the cutting tool. To this end a spool attached to a collet chuck is mounted within a hollow spindle for axial displacement relative to the same. The spindle has formed therein three fluid passageways to make up a thrust sensing valve in combination with the spool. The fluid passageways communicate with pressure operated switches which are selectively actuated upon linear displacement of the spool relative to the spindle in the event of the development of an excessive thrust load on the cutting tool.

This third prior art system is subject to the drawback that complex construction is required solely for the detection of abnormal thrust load. Additional means are needed for the detection of excessive torque load, making the machine tool even more complex and expensive in construction.

SUMMARY OF THE INVENTION

The present invention aims at the provision of an overload detection system for a machine tool that is simpler in construction and more reliable in operation than the listed prior art devices. The overload detection system according to the invention is also notable for its capability of both torque load and thrust load, besides being capable of detecting torque load only.

Stated briefly, the invention provides an overload detection system for a machine tool of the type having a drive spindle for imparting rotation to a cutting tool. The overload detection system comprises a toolholder assembly which is broadly divided into a drive toolholder to be coupled to the drive spindle for joint rotation therewith, and a driven toolholder having means for holding a desired cutting tool such as a drill. The driven toolholder is coupled to the drive toolholder so as to be at least rotatable relative to the same through a preassigned angle about a toolholder axis common to the drive spindle and the drive and the driven toolholders. A coiled torsion spring or like resilient means is provided for between drive toolholder and driven toolholder for torque transmission from the former to the latter. The drive and the driven toolholders have interdigitating teeth with clearances therebetween. A phase detector such as a proximity switch detects a relative phase displacement that will occur between the interdigitating teeth against the force of the torsion spring upon development of abnormal torque load on the cutting tool.

In a preferred embodiment the interdigitating teeth have bevels in sliding engagement with each other. Accordingly, a relative phase displacement also takes place between the two sets of teeth upon axial displacement of the driven toolholder toward the drive toolholder against the force of second resilient means, so that not only abnormal torque load but also abnormal thrust load on the cutting tool is detectable by the single phase detector.

The invention also teaches an electronic overload detection circuit to be connected to the phase detector. The overload detection circuit produces a warning signal upon development of abnormal torque load, or abnormal thrust load, on the cutting tool.

Thus, according to the invention, the machine tool itself needs no substantial alteration at all in construction, all that is required being to mount the toolholder assembly to the drive spindle of the machine tool and to mount the phase detector in a fixed position adjacent the circular path of the interdigitating teeth of the toolholder assembly. Therefore, the overload detection system of this invention finds universal use with machine tools of many different constructions. Any overload on the cutting tool is accurately detectable no matter how small the cutting tool may be in diameter.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
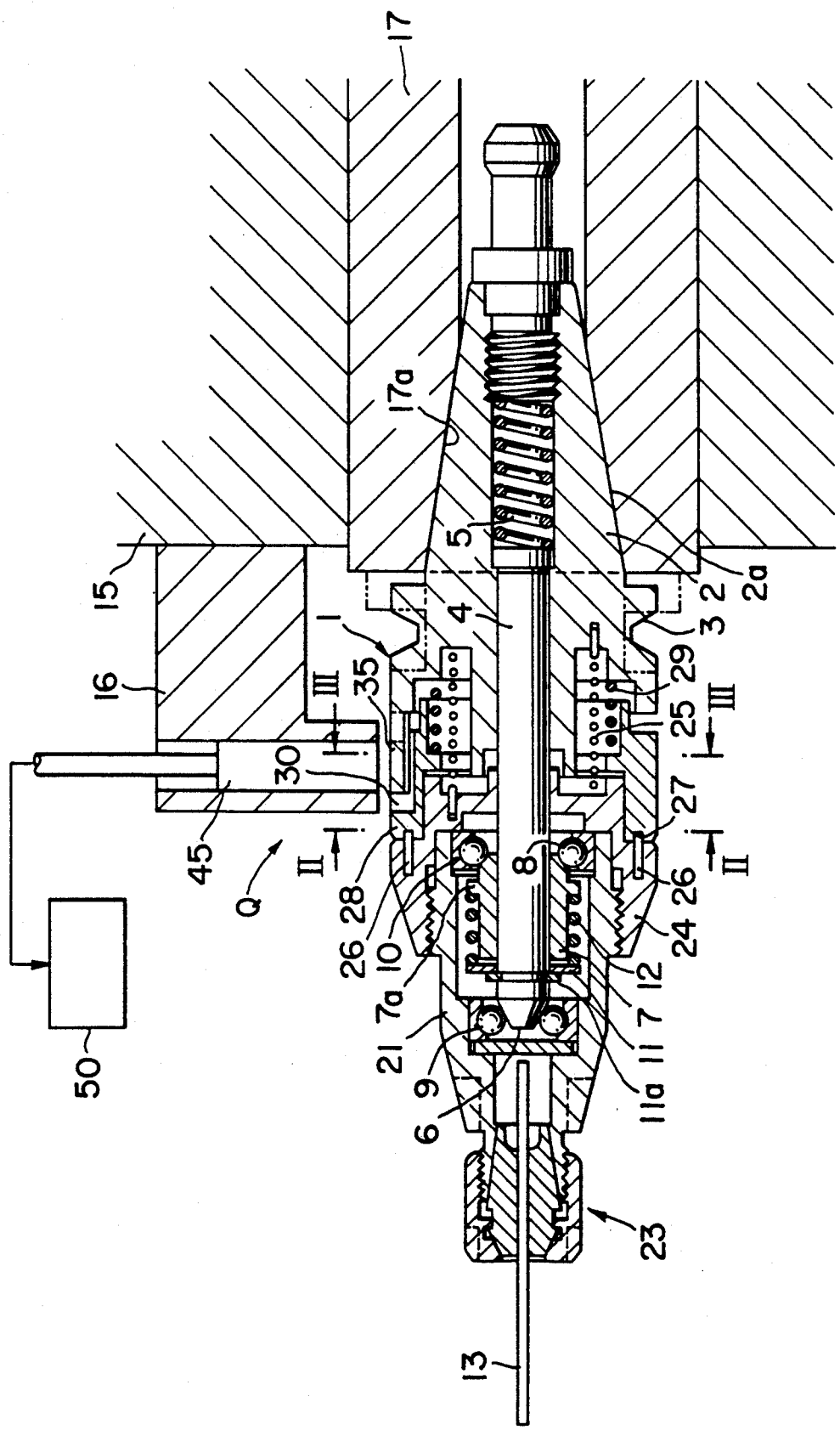
FIG. 1 is an axial section through the toolholder assembly constructed in accordance with the novel concepts of this invention, the toolholder assembly being shown mounted to the drive spindle of a machine tool and also shown together with a proximity switch forming a part of the overload detection system.

With reference first and in particular to FIG. 1, the illustrated machine tool has a spindlehead 15 with a drive spindle 17 rotatably mounted therein. The drive spindle 17 has a tapered hole 17a for driving engagement with a toolholder assembly 1 constructed in accordance with the novel concepts of this invention. The toolholder assembly 1 comprises a drive toolholder 2 and a driven toolholder 21 held end to end in axial alignment and operatively coupled together in a manner to be detailed subsequently.

Generally in the form of a hollow shaft, the drive toolholder 2 has a tapered shank 2a and a collar 3, both formed in one piece therewith. The tapered shank 2a is snugly received in the hole 17a of matching shape in the drive spindle 17. A thrust rod or shaft 4 is mounted in the hollow in the drive toolholder 2 extends into the driven toolholder 21 for rotatably supporting the same. In this particular embodiment the thrust rod 4 together with the driven toolholder 21 thereon is axially slidable in the hollow in the drive toolholder 2. Also mounted in the hollow in the drive toolholder 2, a helical compression spring 5 butts endwise against the thrust rod 4. The compression spring 5 is to bear against the thrust load to be exerted on a cutting tool 13 (e.g. drill) carried by the driven toolholder 21 in the operation of the machine tool. The compression spring 5 is to yield when the thrust load on the cutting tool 13 exceeds a predetermined limit, permitting the thrust rod 4 to retract to the right, as viewed in FIG. 1, with the cutting tool 13 and the driven toolholder 21.

Approximately tubular in shape, the driven toolholder 21 carries a collet chuck 23 of any known or suitable construction on its front or left hand end, as viewed in FIG. 1. The collet chuck 23 conventionally supports the cutting tool 13. The driven toolholder 21 is rotatably mounted to the thrust rod 4 via two combined thrust and radial ball bearings 9 and 10. A torque adjuster 28 of approximately tubular shape is coaxially mounted to the driven toolholder 21 via a connector tube 24 which is threadedly engaged with the driven toolholder. The torque adjuster 28 is capable of both angular and axial displacement relative to the connector tube 24 and hence to the driven toolholder 21. A helical compression spring 29 acts between drive toolholder 2 and torque adjuster 28 for biasing the latter forwardly into abutment against the driven toolholder 21 via the connector tube 24.

The thrust rod 4 has its front end portion 6 shaped into frusto-conical shape for engagement in the bearing 9. Slidably fitted over the thrust rod 4, a sleeve 7 has its rear end portion 8 also shaped into frustoconical shape for engagement in the other bearing 10.

A helical compression spring 12 extends between a pair of spring retainers 7a and 11. The spring retainer 7a is formed in one piece with the sleeve 7. The other spring retainer 11 is fitted over the thrust rod 4 and locked against detachment therefrom by a collar 11a on the thrust rod. The compression spring 12 acts to preload the bearings 9 and 10 via the frustoconical end portions 6 and 8 of the thrust rod 4 and the sleeve 7.

At 25 is seen a coiled torsion spring for torque transmission from drive toolholder 2 to driven toolholder 21. The spring 25 constitutes first resilient means. The torsion spring 25 has one end anchored to the drive toolholder 2 and the other end to the connector tube 24 on the driven toolholder 21. The following means are provided for the adjustment of the torsional strength of this torsion spring 25.

Figure 2:
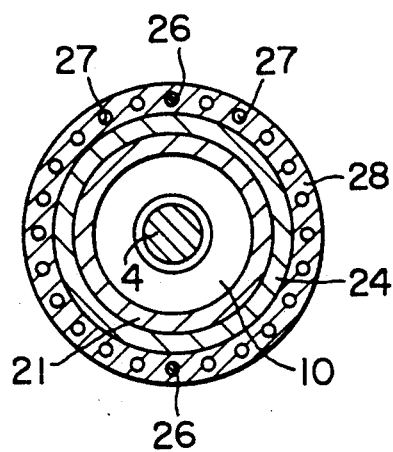
FIG. 2 is a cross section through the toolholder assembly, taken along the line II—II in FIG. 1.

As will be understood from both FIGS. 1 and 2, the connector tube 24 has at least one, preferably two, lockpins 26 formed in diametrically opposite positions on its rear end face opposed to the torque adjuster 28. The lockpins 26 are capable of selective engagement in an annular row of blind holes 27 cut in the front end face of the torque adjuster 28 at constant angular spacings about the axis of the toolholder assembly 1. The lockpins 26 and blind holes 27 constitute selective engagement means. Normally, and as shown in FIG. 1, the lockpins 26 are engaged in two selected ones of the holes 27 under the bias of a helical compression spring 29 acting between drive toolholder 2 and torque adjuster 28. The spring 29 constitutes second resilient means.

Therefore, for the adjustment of the torsional strength of the torsion spring 25, the torque adjuster 28 may first be backed away from the connector tube 24 against the force of the compression spring 29, thereby disengaging the lockpins 26 from the holes 27. Then the connector tube 24 may be revolved together with the driven toolholder 21 in either direction to a required angular position relative to the torque adjuster 28. Then the torque adjuster 28 may be allowed to travel forwardly under the force of the compression spring 29, with the consequent reengagement of the lockpins 26 in the two selected ones of the annular row of holes 27 in the torque adjuster.

The capital Q in FIG. 1 generally designates means for sensing the angular displacement of the driven toolholder 21 with respect to the drive toolholder 2. The description of this sensing means Q follows.

Figure 3:
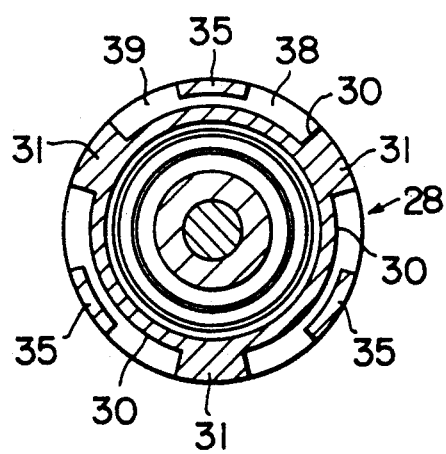
FIG. 3 is another cross section through the toolholder assembly, taken along the line III—III in FIG. 1.

As best revealed by FIG. 3, the torque adjuster 28 has a plurality of, three in this particular embodiment, recesses 30 cut in its outer surface, thereby providing as many uncut portions or teeth 31 disposed at constant angular spacings about the axis of the toolholder assembly 1. The angular spacings between the torque adjuster teeth 31 are 120 degrees in this particular embodiment and are designated -O in FIG. 4.

Figure 4:
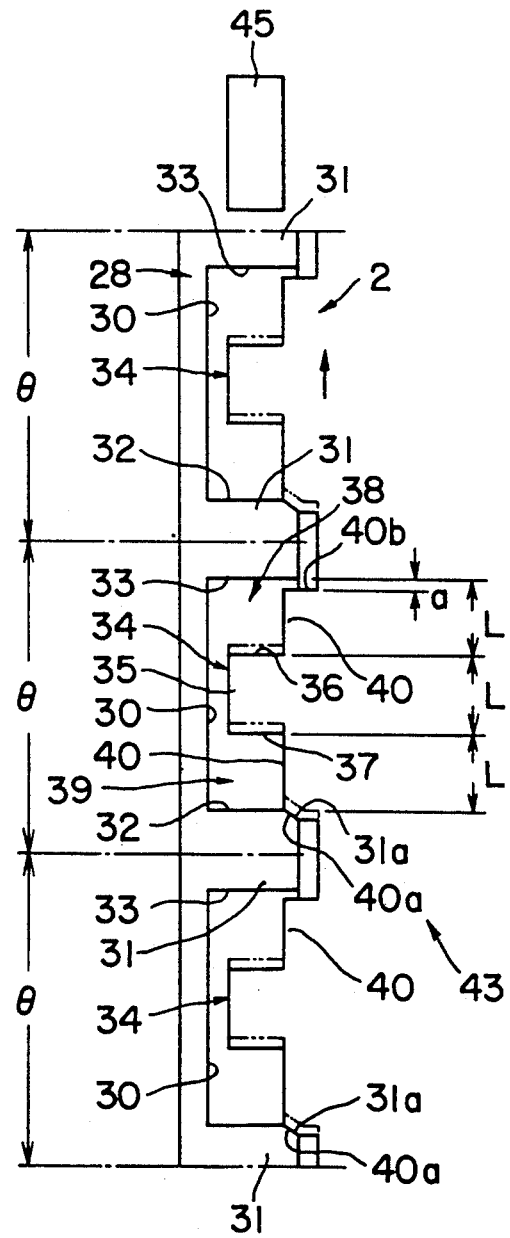
FIG. 4 is a developed diagram of the interdigitating teeth of the toolholder assembly.

FIG. 4 also indicates that the drive toolholder 2 has a plurality of, three in this particular embodiment, teeth 34 extending parallel to the toolholder axis and received between the torque adjuster teeth 31. Hereinafter in this specification, the teeth 34 on the drive toolholder 2 will be referred to as the drive teeth, and the teeth 31 on the torque adjuster 28 as the driven teeth, by way of contradistinction from each other.

As will be seen from both FIGS. 1 and 4, a phase detector is disposed at 45 adjacent the path of the interdigitating drive teeth 34 and driven teeth 31 for detecting the relative phase displacement therebetween. The phase detector takes the form of a proximity switch in this and additional embodiments of the invention disclosed herein and will therefore be referred to as such hereinafter in this specification.

Each drive tooth 34 has a central projection 35 extending toward the torque adjuster 28. Each projection 35 has a circumferential dimension less than that of each driven tooth 31, so that a pair of shoulders 40 are formed by each drive tooth 34 on both sides of its central projection 35. Three pairs of circumferential spacings 38 and 39 are thus defined between the opposite sides 32 and 33 of the driven teeth 31 and the opposite sides 36 and 37 of the projections 35 of the drive teeth 34. The proximity switch 45 is off when opposed to these spacings 38 and 39.

Each driven tooth 31 has a bevel 31a on one of its corners for abutting engagement with a bevel 40a of one of the shoulders 40 of each drive tooth 34. These bevels 31a and 40a are to butt on each other under the force of the torsion spring 25, with a circumferential clearance a normally created between the side 40b of each drive tooth 34 and the side 33 of each driven tooth 31. The bevels 31a and 40a constitute motion translating means 43 for translating the axial displacement of the driven toolholder 21, and hence of the torque adjuster 28, under excessive thrust load into the angular displacement of the driven teeth 31 relative to the drive teeth 34. Therefore, only if this objective is accomplished, such bevels may be formed on only either of the drive and driven teeth for sliding engagement with the required corners of the other of the drive and driven teeth. Other means could be employed as well for the accomplishment of the same objective. As an example of such alternative means, the required corners of the driven teeth 31 and drive teeth 34 might be rounded, instead of being beveled as in the illustrated embodiment. Another example might be guide slots and pins slidably engaged therein.

As will be also noted from FIG. 4, each driven tooth 31, the projection 35 of each drive tooth 34, and the noted spacings 38 and 39 between the driven teeth and the projections of the drive teeth are normally all of the same circumferential dimension L, each spanning an angle of thirty degrees about the toolholder axis in this particular embodiment.

With reference back to FIG. 1 the proximity switch 45 is bracketed at 16 to the spindlehead 15 and electrically connected to an overload detection circuit 50. In practice a phototube may be employed in place of the proximity switch 45, provided that it be protected in any known or suitable way against the adverse effects of the cuttings and cutting oil during machine tool operation.

Figure 5:
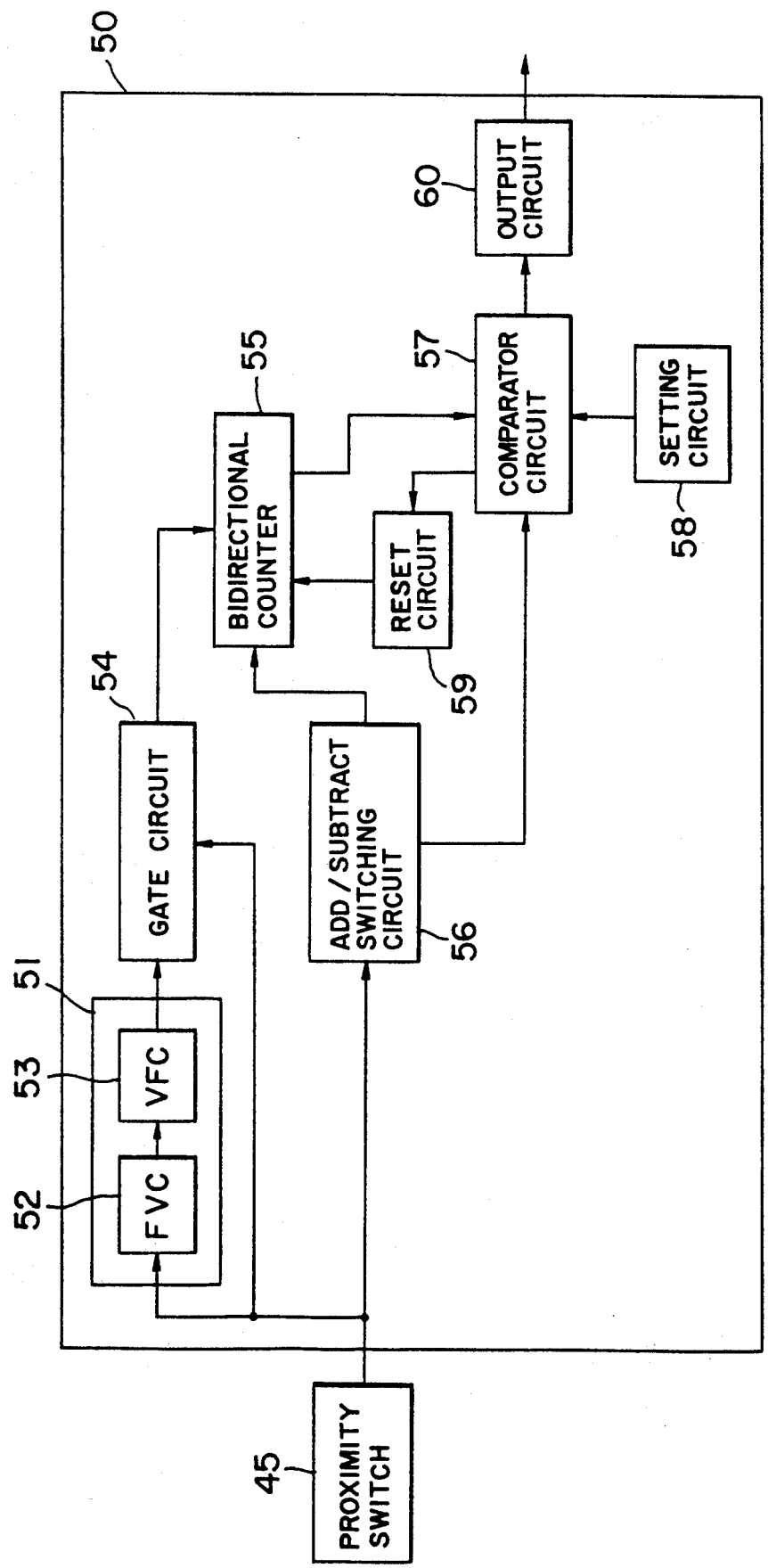
FIG. 5 is a block diagram of the overload detection circuit for use with the toolholder assembly of FIG. 1.

Reference is now directed to the block diagram of FIG. 5 for the detailed study of the overload detection circuit 50 illustrated therein. The overload detection circuit 50 includes a spindle pulse generator 51 herein shown as a serial connection of a frequency to voltage converter (FVC) 52 and a voltage to frequency converter (VFC) 53. The proximity switch 45 is connected directly to the FVC 52. The spindle pulse generator 51 averages and multiplies the pulses generated by the proximity switch 45 and puts out a series of spindle pulses at a prescribed rate per revolution of the drive spindle 17.

A gate circuit 54 has an input connected directly to the proximity switch 45 and another to the spindle pulse generator 51. The gate circuit 54 is open each time the proximity switch 45 is off, permitting the passage of the spindle pulses therethrough.

The output of the gate circuit 54 is connected to a bidirectional counter 55, which has another input connected to the proximity switch 45 via an add/subtract switching circuit 56. This switching circuit 56 causes the counter 55 to alternately add and subtract the incoming spindle pulses during the successive on-off cycles of the proximity switch 45.

A comparator circuit 57 has three inputs connected respectively to the counter 55, the add/subtract switching circuit 56, and a setting circuit 58. The add/subtract switching circuit 56 delivers to the comparator circuit 57 a judgement command when the proximity switch 45 goes on. The comparator circuit 57 responds to this judgement command by judging whether or not the count of the counter 55 is more than a reference value that has been preset on the setting circuit 58. An output circuit 60 produces a warning signal if the counter count is more than the preset reference value. Connected between comparator circuit 57 and counter 55, a reset circuit 59 functions to reset the counter each time the judgment has been made by the comparator circuit.

The reference value to be preset on the setting circuit 58 may be equal to the difference, plus an allowable range of deviations, between the counts of the counter 55 when the proximity switch 45 is opposed to the spacings 38 and 39, FIG. 4, between the driven teeth 31 and the projections 35 of the drive teeth 34, with no load exerted on the cutting tool 13. This difference may be zero in this embodiment, so that the reference value may represent only an allowable range of deviations for the successive pulse counts to be made by the counter 55 during the operation of the machine tool.

The overload detection circuit of FIG. 5 is susceptible to a variety of modifications within the broad teaching hereof. For instance, the spindle pulses may be obtained from the encoder, not shown, associated with the servomotor, also not shown, driving the spindle 17. Also, instead of the spindle pulses produced as above stated, other pulses may be input to the counter at a constant repetition rate from a suitable source of such pulses, and an overload detection signal may be produced when the difference between the pulse counts at the spacings 38 and 39 exceeds a reference value. However, in this case, the reference value must vary with the speed of revolution of the drive spindle 17, so that it may be amended with the spindle speed.

OPERATION

The following operational description of the overload detection system, constructed as so far described with reference to FIGS. 1-5, will be better understood by referring also to the timing diagram of FIG. 6.

During the normal cutting operation of the machine tool illustrated in FIG. 1, the torque of the drive spindle 17 will be imparted directly to the drive toolholder 2 and thence, via the torsion spring 25, to the driven toolholder 21. Thus the proximity switch 45 will alternately go on and off as the drive teeth 34, the driven teeth 31, and the spacings 38 and 39 therebetween travel past the proximity switch. Being spaced a considerable distance away from the cutting tool 13, the proximity switch 45 will function properly without being affected by the cuttings or by the cutting oil.

Figure 6:
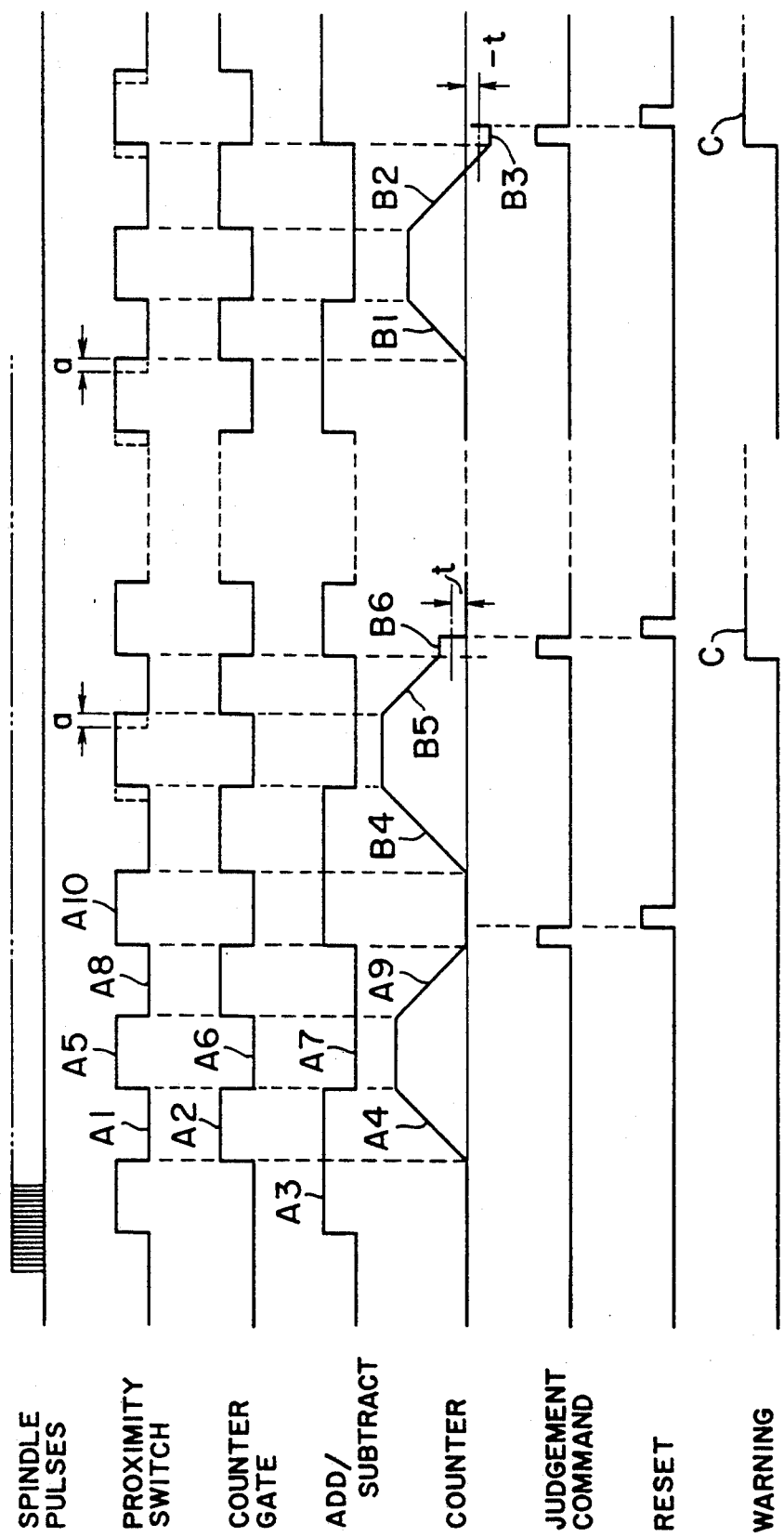
FIG. 6 is a timing diagram useful in explaining the operation of the overload detection system of FIGS. 1-5.

At $A_1$ in FIG. 6 is shown the proximity switch 45 to be off, being opposed to one spacing 38 between drive tooth 34 and driven tooth 31. The gate circuit 54 will be open during this time, as indicated at $A_2$ in FIG. 6, permitting the spindle pulses to pass therethrough into the bidirectional counter 55. Under the add command $A_3$ of the add/subtract switching circuit 56, the counter 55 will count the spindle pulses in an increasing direction, as at $A_4$.

The proximity switch 45 will go on, as at $A_5$, when the projection 35 of one drive tooth 34 subsequently comes opposite the same. Then the gate circuit 54 will become closed, as at $A_6$, and the add/subtract switching circuit 56 will start the production of a subtract command $A_7$. Consequently, when the proximity switch 45 subsequently goes off, as at $A_8$, upon detection of the next spacing 39 between drive tooth 34 and driven tooth 31, the counter 55 will subtract ($A_9$) the incoming spindle pulses from the sum of such pulses that have been counted at $A_4$.

The add/subtract switching circuit 56 will deliver a judgment command to the comparator circuit 57 when the proximity switch 45 subsequently goes on at $A_{20}$ upon detection of one driven tooth 31. The comparator circuit 57 will respond to this judgment command by comparing the count of the counter 55 with the reference value t that has been preset on the setting circuit 58.

Let us assume that the illustrated machine tool has been operating normally, with no excessive torque exerted on the cutting tool 13. In that case, as will be understood from FIG. 4, the bevels 31a and 40a of the teeth 31 and 34 will have been held butting on each other under the force of the torsion spring 25. Therefore, the spacings 38 and 39 between the teeth 31 and 34 will have maintained the same circumferential dimension L about the toolholder axis. This means that the count of the counter 55 was zero at the end of the subtraction at $A_9$. Therefore, the overload detection circuit 50 will remain low, having detected no abnormal torque.

The cutting torque will exceed the value predetermined by the strength of the torsion spring 25 in the event of the blunting of the cutting tool 13, or of the excessive accumulation of the cuttings. Thereupon, a phase lag will occur between drive teeth 34 and driven teeth 31 because of the provision of the clearances a therebetween, and the sides 40b of the drive teeth 34 will relatively move into abutment against the sides 33 of the driven teeth 31. As a result of this relative phase displacement between drive teeth 34 and driven teeth 31, the circumferential dimension of the spacings 38 therebetween will decrease to $L-a$ whereas the circumferential dimension of the other spacings 39 will increase to $L+a$.

FIG. 6 shows the spindle pulses being counted by the counter 55 in an increasing direction at $B_1$ and in a decreasing direction at $B_2$ in the event of the above noted abnormal increase in cutting torque. The resulting count will be equivalent to $-2a$, as indicated at $B_3$. Since the absolute value of this count will be more than the preset reference value t, the output circuit 60 will go high to give a warning C against excessive torque.

The warning signal C may be utilized in any convenient way. For example, the unshown spindle drive motor may be set out of rotation, or a stepback command may be generated, in response to the warning signal. Also, an additional counter may be provided for counting the warnings made by the overload detection circuit 50, and the cutting tool 13 may be replaced whenever such warnings have been counted to a predetermined number.

Possibly, as indicated at $B_4$ and $B_5$ in FIG. 6, the counter 55 may count the spindle pulses in an increasing direction when the proximity switch 45 is opposed to the spacing 39, and in a decreasing direction when the proximity switch is opposed to the spacing 38. The resulting count at $B_6$ will be $+2a$ in this case. However, since the comparator circuit 57 compares the absolute value of the count with the reference value t, the output circuit 60 will generate the desired warning C. All the required functions of the overload detection circuit 50 may be performed by a preprogrammed computer within the scope of this invention.

It is to be noted that in the event of the development of abnormal cutting torque, the counter 55 produces an output equivalent to twice the clearance a between drive teeth 34 and driven teeth 31. Overload will therefore be infallibly detected through minimal relative phase displacement between the drive and the driven teeth. In other words, a minimal increase in cutting torque in excess of the value determined by the torsion spring 25 will be sensed in an instant, making it possible to make any necessary countermeasure without delay.

The toolholder assembly 1 of FIGS. 1-4 is also constructed for the detection of excessive thrust loading on the cutting tool 13, as in the event of its wearout. The compression spring 5 behind the thrust rod 4 will be fully extended in the absence of such excessive thrust load, holding the drive teeth 34 and driven teeth 31 in their relative positions indicated by the solid lines in FIG. 4.

Then, upon development of abnormal thrust load, the compression spring 5 will yield, permitting the thrust rod 4 to retract to the right, as viewed in FIG. 1, with the driven toolholder 21 relative to the drive toolholder 2. As will be understood by referring again to FIG. 4, the consequent rearward displacement of the driven teeth 31 will be translated into their angular displacement relative to the drive teeth 34 as the bevels 31a of the driven teeth slide on the bevels 40a of the drive teeth. The angle of such rotation of the driven teeth 31 corresponds to the clearances a between the drive and the driven teeth.

Thus, as in the above described case of the development of excessive torque load on the cutting tool 13, a difference is created between the circumferential dimensions of each pair of spacings 38 and 39. The overload detection circuit 50 of FIG. 5 can therefore detect the abnormal thrust load, producing the warning C through the procedure set forth above with reference to FIG. 6.

Among the most pronounced features of this embodiment is that the relative phase displacement of the drive and the driven teeth is utilized for the detection of both angular and axial overloads on the cutting tool. The construction of the toolholder assembly can therefore be much simpler than heretofore, and the single proximity switch with the associated overload detection circuit suffices to give warnings upon development of both angular and axial overloads.

SECOND FORM

Figure 7:
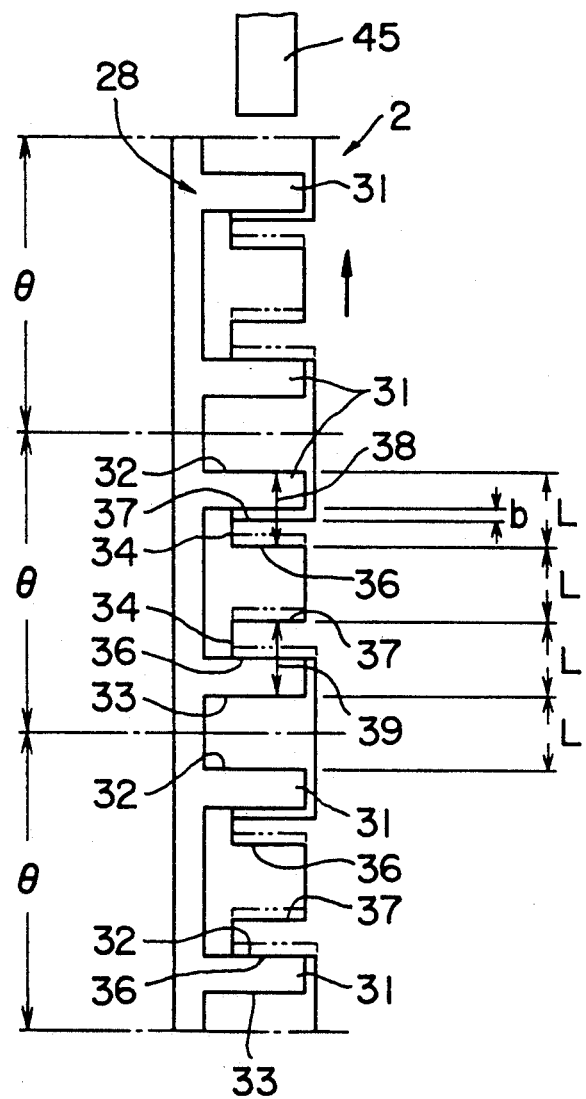
FIG. 7 is a diagram similar to FIG. 4 but showing another preferred form of interdigitating teeth for abnormal torque detection.
Figure 8:
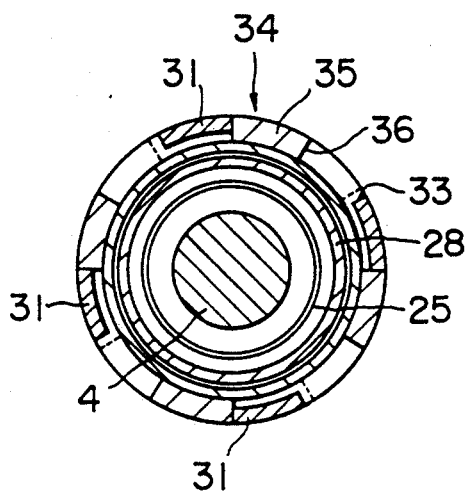
FIG. 8 is a cross sectional view similar to FIG. 3 but showing still another preferred form of toolholder assembly according to the invention.

The drive and the driven teeth constituting a feature of this invention may be configured as illustrated in FIG. 7 for the detection of only excessive torque loading. Thus, although the modified drive and driven teeth are intended to replace their counterparts of the FIG. 1 toolholder assembly 1, it is to be understood that the thrust rod 4, compression spring 5 and other associated means for thrust detection are unnecessary.

The torque adjuster 28 has a plurality of, six in this embodiment, driven teeth 31 each having a pair of opposite sides 32 and 33 and disposed at two different circumferential spacings about the toolholder axis. The smaller of the two different circumferential spacings between the driven teeth 31 is designated L. The circumferential distance between the sides 32 and 33 of any two neighboring driven teeth 31 having the larger spacing therebetween is three times the smaller spacing L. All the driven teeth 31 are of the same circumferential dimension, each spanning an angle of 15 degrees in this embodiment.

The drive toolholder 2 also has a plurality of, six in this embodiment, drive teeth 34 each having a pair of opposite sides 36 and 37 and disposed at two different circumferential spacings about the toolholder axis. The smaller of the two different circumferential spacings between the drive teeth 34 is the same as the smaller spacing L between the driven teeth 31. Any two neighboring drive teeth 34 having the smaller spacing L therebetween is loosely received between two of the driven teeth 31 having the greater spacing therebetween.

As in the preceding embodiment, the drive teeth 34 and the driven teeth 31 are circumferentially sprung in opposite directions so that the side 32 of every other driven tooth 31 normally butts on the side 36 of every other drive tooth 34, as indicated by the solid lines in FIG. 7. Therefore, a clearance b is normally created between every two neighboring drive teeth 34 and every two neighboring driven teeth 31. This clearance b should be so small as to be undetectable by the proximity switch 45. Further the reference value t to be preset on the setting circuit 58, FIG. 5, should be less than the number of spindle pulses equivalent to the absolute value of twice the clearance b.

An inspection of FIG. 7 will also reveal that every two neighboring drive teeth 34 are of different circumferential dimensions, one being wider than the other by b. Thus, as indicated by the double headed arrows 38 and 39 in this figure, the sum of the circumferential dimension of each wider drive tooth 34 and that of one driven tooth 31 is the same as the sum of the circumferential dimension of each narrower drive tooth 34, that of one driven tooth, and the clearance b therebetween, being both L.

OPERATION OF SECOND FORM

Normally, that is, when the driven teeth 31 butt on the wider drive teeth 34, the proximity switch 45 will be on for the same period of time when opposed to each adjacent pair 38 of one narrower drive tooth and one driven tooth and to each adjacent pair 39 of one wider drive tooth and one driven tooth.

Then, upon development of excessive cutting torque, a relative phase displacement will occur between the drive and the driven teeth. Consequently, as indicated by the broken lines in FIG. 7, the circumferential dimension of each adjacent pair 38 of one narrower drive tooth and one driven tooth will decrease to L−b whereas the circumferential dimension of each adjacent pair 39 of one wider drive tooth and one driven tooth will increase to L+b. The absolute value of the count made by the counter 55, FIG. 5, will therefore be equivalent to 2b if the counter counts the spindle pulses in an increasing direction when the proximity switch 45 is opposed to the pair 38 of drive and driven teeth, and in a decreasing direction when the proximity switch is opposed to the next pair 39 of drive and driven teeth. This value 2b has been assumed to be greater than the preset reference value t, so that the overload detection circuit 50 will put out the torque overload warning signal through the procedure that has been discussed with reference to FIG. 6.

Thus, in the two preferred embodiments of this invention disclosed in the foregoing, overload on the cutting tool is readily detectable from a relative phase displacement between the drive and the driven teeth. Moreover, such phase displacement is sensed as twice the angle of actual displacement of the driven teeth with respect to the drive teeth, so that only a minimal phase displacement is required for quick, positive overload detection.

THIRD FORM

FIGS. 8–11 show another alternative form of overload detection means according to the invention. As will be understood from FIGS. 8 and 10, a plurality of, four in this embodiment, drive teeth 34 are formed on the drive toolholder such as that shown at 2 in FIG. 1 at constant circumferential spacings about the toolholder axis. Each drive tooth 34 has a projection 35 and a shoulder 40 on one side thereof.

Arranged interdigitatingly with the drive teeth 34 are as many driven teeth 31 formed on the torque adjuster 28 at constant circumferential spacings about the toolholder axis. Normally, as indicated by the solid lines in FIG. 9, each driven tooth 31 butts on the projection 35 of each drive tooth 34 under the force of the torsion spring 25, FIG. 1, so that a clearance c exists between the shoulder 40 of each drive tooth 34 and the side 33 of each driven tooth 31.

Figure 10:
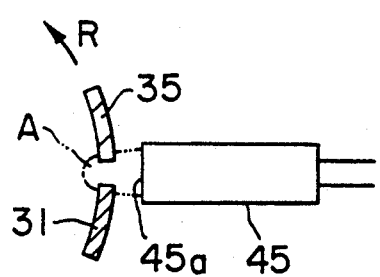
FIG. 10 is a diagram explanatory of the sensing zone of the proximity switch used with the toolholder assembly of FIG. 8.

Let us consider each adjacent pair 38A of one drive tooth 34 and one driven tooth 31. The drive and driven tooth pair has a circumferential dimension $L_1$ between the side 36 of the drive tooth projection 35 and the side 33 of the driven tooth 31. As illustrated in FIG. 10, the proximity switch 45 has the predetermined sensing zone A which varies in cross sectional area as it extends away from the sensing end 45a of the proximity switch. The clearance c between the drive and driven teeth of this embodiment is less than the cross sectional size of the sensing zone A. Consequently, the proximity switch 45 is not to be turned off by the spacing c that will be created between each adjacent pair 38a of drive tooth 34 and driven tooth 31 upon development of excessive cutting torque.

Figure 11:
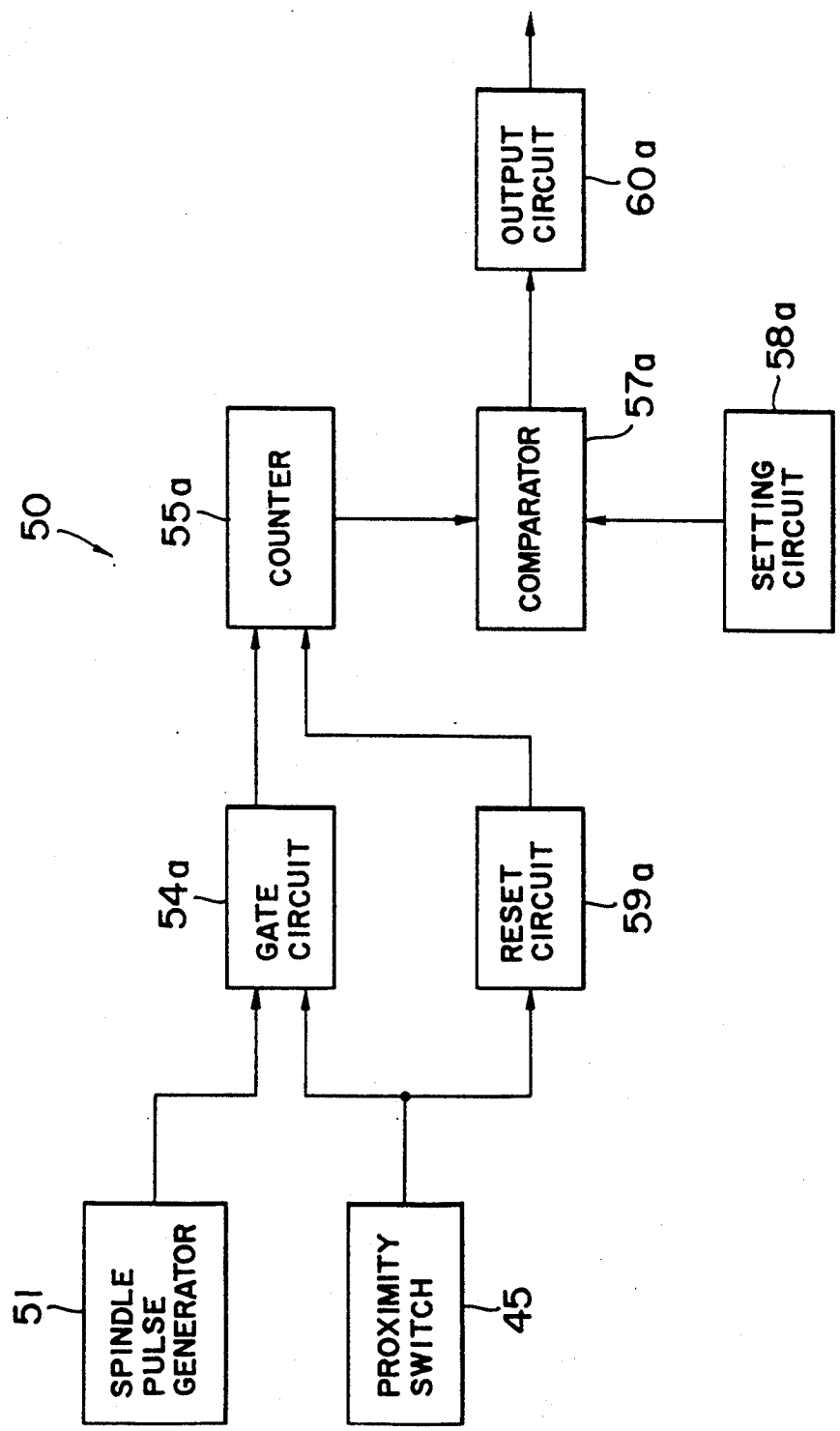
FIG. 11 is a block diagram of an overload detection circuit for use with the toolholder assembly of FIGS. 8 and 9.

FIG. 11 is a diagram of a modified overload detection circuit 50. This circuit includes a spindle pulse generator 51, as in the form of a rotary encoder driven by the drive spindle 17, for generating a predetermined number of spindle pulses for each revolution of the spindle. The spindle pulse generator 51 is connected to a gate circuit 54a, to which is also connected the proximity switch 45. The gate circuit 54a opens when the proximity switch 45 is on, permitting the spindle pulses to pass on to a counter 55a. Connected between proximity switch 45 and counter 55a, a reset circuit 59a functions to reset the counter when the proximity switch goes off.

A comparator circuit 57a has an input connected to the counter 55a, another input to a setting circuit 58a, and an output to an output circuit 60a. As in the overload detection circuit shown in FIG. 5, the output circuit 60a produces an overload warning signal when the spindle pulse count of the counter 55a is more than a reference value that has been preset on the setting circuit 58a.

The reference value to be preset on the setting circuit 58a is equivalent to the number of the spindle pulses, plus an allowable range of deviations, to be counted by the counter 55a while the proximity switch 45 is opposed to one adjacent pair 38A of drive tooth 34 and driven teeth 31, with no abnormal torque on the cutting tool. The preset reference value will be less than the pulse count of the counter 55a upon development of abnormal torque.

Alternatively, for the determination of the reference value, each design angle may be computed through which the proximity switch 45 is to be held on. Then the reference value may be so determined as to be equivalent to the number of spindle pulses corresponding to the above computed angle plus the allowed dimensional errors of the drive and the driven teeth and an allowable range of deviations.

Also, for such exact detection of phase displacement as to be affected by allowed dimensional errors, there may first be ascertained the normal numbers of spindle pulses counted when the proximity switch is opposed to the respective pairs 38A of drive and driven teeth. Then, during cutting operation, these normal numbers may be compared with the actual numbers of spindle pulses that have been counted by separate counters corresponding to the respective pairs 38A of drive and driven teeth.

OPERATION OF THIRD FORM

Figure 9:
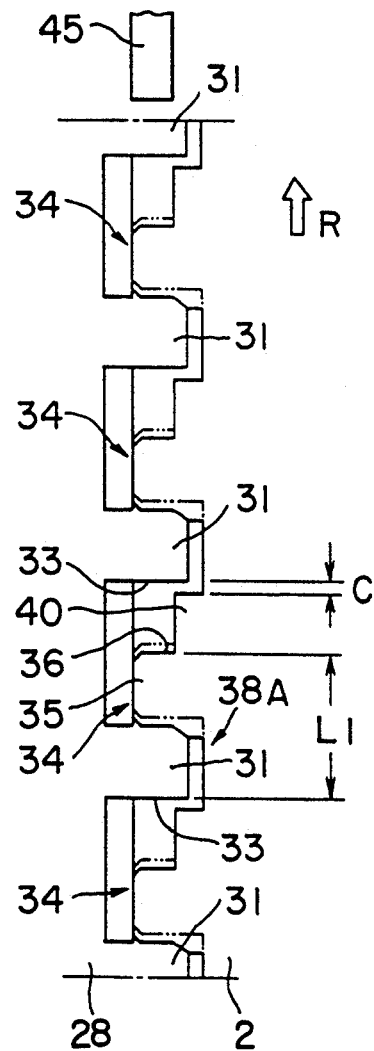
FIG. 9 is a diagram similar to FIG. 4 but showing the interdigitating teeth of the toolholder assembly of FIG. 8.

The projections 35 of the drive teeth 34 will remain butting on the driven teeth 31, as indicated by the solid lines in FIG. 9, under the force of the torsion spring 25, FIG. 1, as long as the load torque on the cutting tool is not so great as to cause its destruction. The circumferential dimension $L_1$ of the four pairs 38A of drive and driven teeth will remain the same during such normal cutting operation as when the machine tool is out of operation. Thus, each time the proximity switch 45 is opposed to one pair 38A of drive and driven teeth, the counter 55a will count the spindle pulses to a number less than the reference value that has been preset on the setting circuit 58a. No overload warning signal will therefore be produced.

Upon development of a cutting torque in excess of the limit determined by the torsion spring 25, a phase displacement will occur between the drive teeth 34 and driven teeth 31 through an angle corresponding to the clearances c therebetween, as indicated by the broken lines in FIG. 9. This phase displacement will create a spacing, equal to the clearance c, between each adjacent pair 38A of drive and driven teeth. However, this spacing is undetectable by the proximity switch 45 for the reason that has been set forth with reference to FIG. 10. It therefore follows that, essentially, the circumferential dimension of each adjacent pair 38A of drive and driven teeth has increased to $L_1+c$.

Thus the counter 55a will count the spindle pulses to a number greater than the preset reference value while the proximity switch 45 is being opposed to one adjacent tooth pair 38A of the above increased circumferential dimension. Then the output circuit 60a will produce the overload warning signal. This warning signal may be utilized in any of the ways described in connection with the FIGS. 1-6 embodiment.

It is not essential in this embodiment that the relative phase displacement between the drive and driven teeth be detected on the basis of the number of spindle pulses counted while the proximity switch 45 is being opposed to each adjacent pair 38A of drive and driven teeth. Alternatively, such phase displacement may be detected on the basis of the number of spindle pulses counted while the proximity switch 45 is being opposed to the spacing between the opposed sides 33 and 36 of each driven teeth 31 and each drive tooth projection 35. This spacing will decrease upon development of abnormal cutting torque, resulting in a corresponding decrease in the number of spindle pulses counted, from which fact the abnormal cutting torque may be detected.

This third embodiment features the fact that the clearances c between the drive and driven teeth are made so small as to be per se undetectable by the proximity switch 45. This feature makes it possible to detect abnormal cutting torque even when it exceeds to the slightest degree the limit set by the torsion spring.

Despite the foregoing detailed description of some representative embodiments, it is not desired that the present invention be limited by the exact details of such disclosure. A variety of modifications or alterations may be resorted to without departure from the fair meaning or proper scope of the following claims.

What is claimed is:

1. An overload detection system for a machine tool of the type having a drive spindle for imparting rotation to a cutting tool, the overload detection system comprising:
   (a) a drive toolholder to be coupled to the drive spindle for joint rotation therewith;
   (b) a driven toolholder coupled to the drive toolholder so as to be rotatable relative to the same through a preassigned angle about a toolholder axis common to the drive spindle and the drive and the driven toolholders, the driven toolholder having means for holding the cutting tool, said driven toolholder being axially movable toward and away from the drive toolholder within a limit;

(c) first resilient means connecting the drive and the driven toolholders for torque transmission from the former to the latter;

(d) a set of drive teeth formed on the drive toolholder at constant circumferential spacings about the toolholder axis;

(e) a set of driven teeth formed on the driven toolholder at constant circumferential spacings about the toolholder axis and arranged interdigitatingly with the drive teeth with clearances therebetween;

(f) second resilient means acting between the drive and the driven toolholders for biasing the latter away from the former, the second resilient means yielding to permit the axial displacement of the driven toolholder toward the drive toolholder upon development of abnormal thrust load on the cutting tool;

(g) motion translating means provided between the driven and the drive toolholders for causing a relative phase displacement between the drive and the driven teeth against the force of the first resilient means in response to axial displacement of the driven toolholder toward the drive toolholder against the bias of the second resilient means; and (h) a phase detector for detecting a relative phase displacement that will occur between the drive and the driven teeth in opposition to the force of said first resilient means upon development of abnormal torque and/or abnormal thrust load on the cutting tool.

2. The overload detection system of claim 1 wherein the motion translating means comprises bevels formed on at least either of the drive and driven teeth for sliding engagement with the other of the drive and driven teeth.

3. The overload detection system of claim 1 wherein the phase detector is a proximity switch.

4. The overload detection system of claim 3 wherein the machine tool has a spindlehead to which the drive spindle is rotatably mounted, and wherein the proximity switch is mounted to the spindlehead.

5. The overload detection system of claim 1 further comprising an overload detection circuit connected to the phase detector for producing a warning signal upon detection of a relative phase displacement between the drive and the driven teeth by the phase detector.

6. The overload detection system of claim 1 wherein either of the drive and the driven teeth have each a projection loosely received between two neighboring ones of the other of the drive and the driven teeth to provide a pair of spacings therebetween, and wherein the phase detector detects a relative phase displacement between the drive and the driven teeth on the basis of the circumferential dimensions of each pair of spacings between the drive and the driven teeth.

7. The overload detection system of claim 6 further comprising an overload detection circuit connected to the phase detector for producing a warning signal upon detection of a relative phase displacement between the drive and the driven teeth, the overload detection circuit comprising:

(a) a pulse generator for generating a series of spindle pulses at a prescribed repetition rate;

(b) a bidirectional counter for counting the spindle pulses in one direction when the phase detector is opposed to one of each pair of spacings between the drive and the driven teeth, and in the other direction when the phase detector is opposed to the other of each pair of spacings between the drive and the driven teeth; and (c) a comparator circuit for comparing the spindle pulse count of the bidirectional counter with a preset reference value.

8. The overload detection system of claim 1 wherein either of the drive and the driven teeth are all of constant circumferential dimension, wherein the other of the drive and the driven teeth are each divided into a wider tooth section and a narrower tooth section which are both received between two neighboring ones of said either of the drive and the driven teeth, with the clearance normally created between each narrower tooth section and one of said either of the drive and the driven teeth, the sum of the circumferential dimensions of each wider tooth section and one of said either of the drive and the driven teeth being equal to the sum of the clearance and the circumferential dimensions of each narrower tooth section and one of said either of the drive and the driven teeth, and wherein the clearance normally created between each narrower tooth section and one of said either of the drive and the driven teeth is sufficiently small to be undetectable by the phase detector.

9. The overload detection system of claim 8 further comprising an overload detection circuit connected to the phase detector for producing a warning signal upon detection of a relative phase displacement between the drive and the driven teeth, the overload detection circuit comprising:

(a) a pulse generator for generating a series of spindle pulses at a prescribed repetition rate;

(b) a bidirectional counter for counting the spindle pulses in one direction when the phase detector is opposed to each wider tooth section and an adjacent one of said either of the drive and the driven teeth, and in the other direction when the phase detector is opposed to each narrower tooth section and an adjacent one of said either of the drive and the driven teeth; and (c) a comparator circuit for comparing the spindle pulse count of the bidirectional counter with a preset reference value.

10. The overload detection system of claim 1 wherein either of the drive and the driven teeth have each a projection loosely received between two neighboring ones of the other of the drive and the driven teeth to provide a spacing on one side of the projection, and wherein the phase detector detects a relative phase displacement between the drive and the driven teeth on the basis of the circumferential dimensions of each projection and an adjacent one of said other of the drive and the driven teeth, or of the circumferential dimension of each spacing between one projection and an adjacent one of said other of the drive and the driven teeth.

11. The overload detection system of claim 10 further comprising an overload detection circuit connected to the phase detector for producing a warning signal upon detection of a relative phase displacement between the drive and the driven teeth, the overload detection circuit comprising:

(a) a pulse generator for generating a series of spindle pulses at a prescribed repetition rate;

(b) a counter for counting the spindle pulses when the phase detector is opposed to each projection and an adjacent one of said other of the drive and the driven teeth; and (c) a comparator circuit for comparing the spindle pulse count of the bidirectional counter with a preset reference value.

12. The overload detection system of claim 10 further comprising an overload detection circuit connected to the phase detector for producing a warning signal upon detection of a relative phase displacement between the drive and the driven teeth, the overload detection circuit comprising:

(a) a pulse generator for generating a series of spindle pulses at a prescribed repetition rate;

(b) a bidirectional counter for counting the spindle pulses when the phase detector is opposed to each spacing between one projection and an adjacent one of said other of the drive and the drive teeth; and (c) a comparator circuit for comparing the spindle pulse count of the bidirectional counter with a present reference value.

13. An overload detection system for a machine tool of the type having a drive spindle for imparting rotation to a cutting tool, the overload detection system comprising:

(a) a drive toolholder to be coupled to the drive spindle for joint rotation therewith;

(b) a driven toolholder coupled to the drive toolholder so as to be rotatable relative to the same through a preassigned angle about a toolholder axis common to the drive spindle and the drive and the driven toolholders, the driven toolholder having means for holding the cutting tool, said driven toolholder being axially movable toward and away from the drive toolholder within a limit;

(c) first resilient means connecting the drive and the driven toolholders for torque transmission from the former to the later;

(d) a torque adjuster of annular shape disposed coaxially between the drive and the driven toolholders for both axial and rotary displacement relative to the drive and the driven toolholders;

(e) selective engagement means for locking together the driven toolholder and the torque adjuster against rotation relative to each other in a selected angular position of the driven toolholder relative to the drive toolholder in order to adjustably vary the resistance offered by the resilient means against load torque on the cutting tool;

(f) a set of drive teeth formed on the drive toolholder at constant circumferential spacings about the toolholder axis;

(g) a set of driven teeth formed on the torque adjuster at constant circumferential spacings about the toolholder axis and arranged interdigitatingly with the drive teeth with clearances therebetween;

(h) second resilient means acting between the drive and the driven toolholders for biasing the latter away from the former, the second resilient means yielding to permit the axial displacement of the driven toolholder toward the drive toolholder upon development of abnormal thrust load on the cutting tool;

(i) motion translating means provided between the drive toolholder and the torque adjuster for causing a relative phase displacement between the drive and the driven teeth against the force of the first resilient means in response to axial displacement of the driven toolholder toward the drive toolholder against the bias of the second resilient means; and (j) a phase detector for detecting a relative phase displacement that will occur between the drive and the driven teeth in opposition to the force of said first resilient means upon development of abnormal torque and/or abnormal thrust load on the cutting tool.

14. The overload detection system of claim 13 wherein the selective engagement means comprises:

(a) at least one lockpin formed on either of the driven toolholder and the torque adjuster for selective engagement in a row of holes formed in the other of the driven toolholder and the torque adjuster in annular arrangement about the toolholder axis; and (b) second resilient means for urging the torque adjuster against the driven toolholder.

15. The overload detection system of claim 13 wherein the driven toolholder is axially movable with the torque adjuster toward and away from the drive toolholder within limits, and wherein the overload detection system further comprises:

(a) a thrust rod slidably received in an axial hollow in the drive toolholder and partly extending into the driven toolholder; and (b) radial and thrust bearing means on the thrust rod for rotatably supporting the driven toolholder thereon, the thrust rod being movable axially with the driven toolholder relative to the drive toolholder.

16. The overload detection system of claim 15 wherein the radial and thrust bearing means comprises a first and a second radial and thrust bearing, wherein the thrust rod has an end portion of frustoconical shape for rolling engagement with the first radial and thrust bearing, and wherein the system further comprises:

(a) a sleeve fitted over the thrust rod and having an end portion of frustoconical shape for rolling engagement with the second radial and thrust bearing; and (b) compression spring means for holding the frustoconical end portion of the thrust rod and the frustoconical end portion of the sleeve in rolling engagement with the first and the second radial and thrust bearings.

* * * * *